United States Patent [19]

Poole

[11] Patent Number: 5,261,016
[45] Date of Patent: Nov. 9, 1993

[54] CHROMATIC DISPERSION COMPENSATED OPTICAL FIBER COMMUNICATION SYSTEM

[75] Inventor: Craig D. Poole, Ocean, N.J.
[73] Assignee: AT&T Bell Laboratories, Murray Hill, N.J.
[21] Appl. No.: 995,285
[22] Filed: Dec. 22, 1992

Related U.S. Application Data

[63] Continuation-in-part of Ser. No. 766,600, Sep. 26, 1991, Pat. No. 5,185,827.

[51] Int. Cl.[5] ............................ G02B 6/00; G02B 6/36
[52] U.S. Cl. ...................................................... 385/28
[58] Field of Search .................................... 385/25-29

[56] References Cited

U.S. PATENT DOCUMENTS

| | | | |
|---|---|---|---|
| 4,067,642 | 1/1978 | King et al. | 385/27 |
| 4,261,639 | 4/1981 | Kogelnik et al. | 385/27 |
| 4,974,931 | 12/1990 | Poole | 385/28 |
| 5,185,827 | 2/1993 | Poole | 385/28 |

OTHER PUBLICATIONS

Gloge, D., Applied Optics, vol. 10, No. 10, Oct. 1971, "Weekly Guiding Fibers," pp. 2252-2258.
Taylor, H. F., J. Lightwave Technology, vol. LT-2, No. 5, Oct. 1984, "Bending Effects in Optical Fibers," pp. 617-628.
Youngquist et al., Optics Letters, vol. 9, No. 5, May 1984, "Two-Mode, Fiber Modal Coupler," pp. 177-179.
Kim et al., Optics Letters, vol. 12, No. 9, Sep. 1987, "Use of Highly Elliptical Core Fibers for Two-Mode Fiber Devices,:" pp. 729-731.
Sorin et al., Optics Letters, vol. 11, No. 9, Sep. 1986, "Highly Selective Evanescent Modal Filter for . . . ," pp. 581-583.
Blake et al., Optics Letters, vol. 11, No. 3, Mar. 1986, "Fiber-Optics Modal Coupler Using Periodic Microbending," pp. 177-179.
Park et al., Electronics Letters, vol. 25, No. 12, Jun. 8, 1989, "Intermodal Coupler Using Permanently . . . ," pp. 797-799.
Hill et al., IEEE Photonics Technology Letters, vol. 2, No. 7, Jul. 1990, "A Novel Low-Loss Inline Bimodel-Fiber Tap: Wavelength . . . ," pp. 484-486.
Oullette, F., Optics Letters, vol. 16, No. 5, Mar. 1, 1991, "All-fiber filter for efficient dispersion compensation," pp. 303-305.
Poole et al., OFC '92, 1992, "Broad-band Dispersion Compensation Using the Higher-order Spatial-mode in a Two-mode Fiber," pp. 363-365.
Poole et al., Optics Letters, vol. 17, No. 14, Jul. 15, 1992, "Broadband dispersion compensation by using the . . . ," pp. 985-987.
Poole et al., Proceedings for European Conf. on Optical Communication ECOC'92, Berlin Germany, vol. 3, paper PDI.4, "Elliptical-Core Dual-Mode Fiber Dispersion Compensator".

*Primary Examiner*—Akm E. Ullah
*Attorney, Agent, or Firm*—Eugen E. Pacher

[57] ABSTRACT

An optical fiber communication system according to the invention comprises, in addition to conventional single mode (SM) optical fiber, dispersion compensating (DC) optical fiber. The DC fiber is selected such that its chromatic dispersion ($D_{DC}(\lambda)$) and first derivative of the chromatic dispersion with respect to wavelength ($D'_{DC}(\lambda)$) at a wavelength $\lambda = \lambda_{op}$ have opposite sign from those of the SM fiber. Advantageously, the DC fiber is selected such that $L_{DC} \cdot D_{DC}(\lambda) + L \cdot D(\lambda)$ is approximately zero at $\lambda = \lambda_{op}$, and such that $D'_{DC}(\lambda)$ is approximately equal to $-(L/L_{DC}) \cdot D'(\lambda)$ at $\lambda = \lambda_{op}$, where $L_{DC}$ and $L$ are appropriate lengths of DC and SM fiber, respectively. Typically, L is much greater than $L_{DC}$, and $\lambda_{op}$ typically is about 1.5 μm, e.g., about 1.56 μm. Preferred embodiments of the invention have low chromatic dispersion over a substantial wavelength region (e.g., dispersion less than 1.5 ps/nm·km over at least 50 nm) that includes $\lambda_o$, facilitating wavelength division multiplexing.

11 Claims, 4 Drawing Sheets

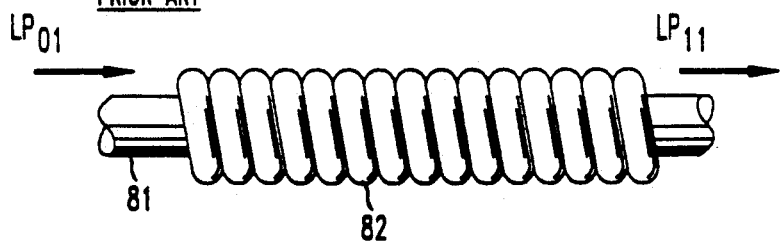
FIG. 8
PRIOR ART
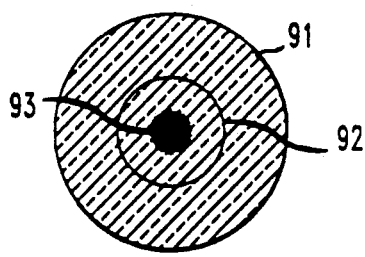
FIG. 9
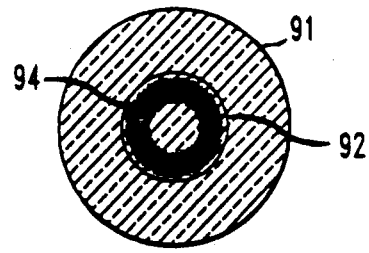
FIG. 10
FIG. 11
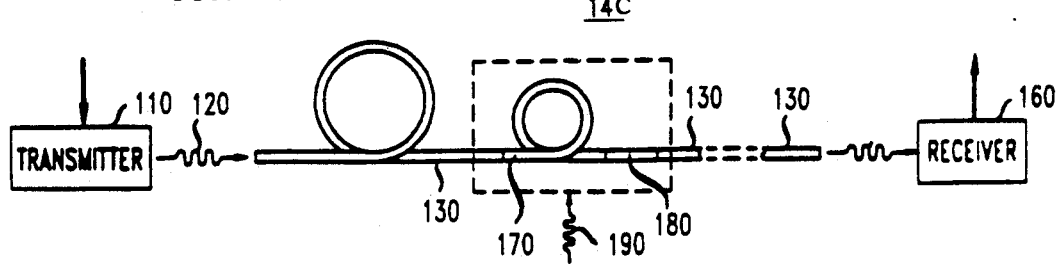

CHROMATIC DISPERSION COMPENSATED OPTICAL FIBER COMMUNICATION SYSTEM

This is a continuation-in-part application of U.S. patent application Ser. No. 07/766,600, filed Sep. 26, 1991 now U.S. Pat. No. 5,185,827.

TECHNICAL FIELD

This invention relates to optical fiber communication systems and, more particularly, to systems that comprise chromatic dispersion compensating optical fiber.

BACKGROUND OF THE INVENTION

With increased demand being placed on existing optical fiber facilities, lightwave communications providers are looking for ways to increase the usable bandwidth available for customers from existing fiber without installing additional fibers. Lightwave communication systems depend on optical fiber to transport the lightwave signals from one location to another in the system.

Optical fiber, both single mode and multimode, has modal and chromatic dispersion parameters which result from material and waveguide characteristics of the fiber. Chromatic dispersion causes lightwaves at one wavelength to travel at a different velocity through the optical fiber than lightwaves at another wavelength. Thus, for example, a short pulse input to one end of the fiber emerges from the far end as a broader pulse. Pulse broadening effects and, therefore, dispersion limit the rate at which information can be carried through an optical fiber.

Several solutions have been proposed to avoid or at least mitigate the effects of dispersion. These solutions include dispersion compensation techniques. One approach described in U.S. Pat. No. 4,261,639, involves the interconnection of two optical fibers having appropriate lengths and having opposite group velocity dispersion characteristics so that the total dispersion in one fiber is substantially matched and canceled by the total dispersion in the connected fiber. While this technique offers a possible solution to the dispersion problem, it is impractical (1) because the length of compensating (opposite dispersion) fiber typically will be very long, on the order of the length of the existing installed fiber, and (2) because there may be insufficient fiber available having the appropriate dispersion of opposite sign to dispersion of the existing installed fiber.

In order to avoid the use of dispersion compensating fibers as described above, reflective and transmissive Fabry-Perot etalon structures have been proposed for providing optical equalization. For a discussion of these structures, see *J. of Lightwave Technology*, Vol. 8, No. 5, pp. 649-59 (1990). Adaptive control via a feedback loop is demonstrated for the structures. It is believed that the hardware complexity of these optical equalization structures together with the need to provide substantially continuous monitoring and tuning of the etalon significantly affect the commercial attractiveness of such structures. Thus, a convenient dispersion compensation technique, especially such a technique that results in low chromatic dispersion over a significant wavelength range, would be of substantial interest. This application discloses such a technique.

SUMMARY OF THE INVENTION

Chromatic dispersion is efficiently compensated in a compact device by combining a spatial mode converter with a dispersive waveguide, such as a length of multimode or dual-mode fiber, having a dispersion characteristic of substantially equivalent magnitude, and opposite sign, to the desired amount of dispersion to be compensated. The spatial mode converter exchanges the optical energy from one propagating spatial mode to another spatial mode whose propagation is supported by the multimode or dual-mode fiber. By performing the mode exchange, it is possible to utilize the larger opposite dispersion in the dispersive waveguide to balance the unwanted chromatic dispersion. This apparatus is applicable to lightwave repeaters, regenerators, transmitters, and receivers.

In one embodiment, the dispersive waveguide and the spatial mode converter are juxtaposed so that light is coupled into the higher order spatial mode supported in the dual-mode fiber, subjected to dispersion compensation (pulse compression), and transferred to a spatial mode converter for conversion to the fundamental spatial mode to be transmitted in a single mode transmission fiber. This embodiment predistorts the light in a way which substantially cancels the effects of dispersion in the long transmission fiber.

Still other embodiments include the use of spatial mode converters on either end of the dual-mode fiber, and the use of an absorption element in the dual-mode waveguide or fiber to substantially eliminate propagation of any unwanted spatial mode or modes in the dual-mode fiber or waveguide.

A further embodiment is an article, typically an optical fiber communication system, that comprises dispersion compensation (DC) fiber as well as conventional single mode fiber, with the former having negative chromatic dispersion and a negative derivative with respect to wavelength at a wavelength $\lambda_{op}$, typically about 1.5 $\mu$m. More generally, the DC fiber has chromatic dispersion and dispersion slope of opposite sign as the chromatic dispersion and dispersion slope of the single mode fiber.

BRIEF DESCRIPTION OF THE DRAWING

A more complete understanding of the invention may be obtained by reading the following description of specific illustrative embodiments of the invention in conjunction with the appended drawing in which:

FIGS. 6-8 show alternative prior art embodiments for the optical mode converter shown in FIGS. 1-3;

FIGS. 9-10 show illustrative cross-sectional views of rare-earth doped optical fiber used in realizing specific embodiments of the dispersive waveguide element shown in FIGS. 1-3; and FIG. 11 schematically shows an exemplary optical fiber communication system according to the invention.

DETAILED DESCRIPTION

Figure 1:
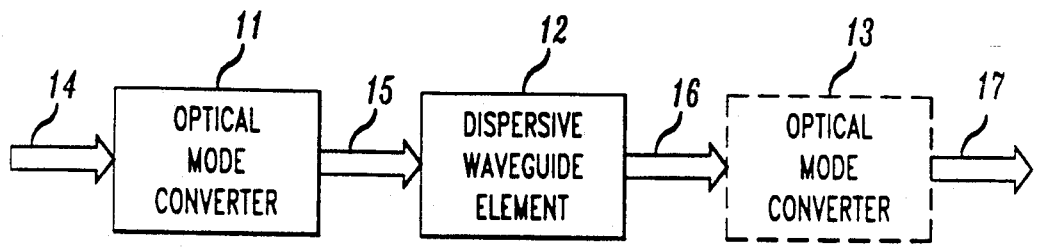
FIGS. 1-3 show various block diagram embodiments of the dispersion compensation apparatus.

Information capacity represented as the bit rate of data signals is an important measure of capability of a telecommunication system. Because of certain effects along the transmission medium of the system, the bit rate and, therefore, the utility and appeal of the system are seriously impaired. This is especially true in lightwave communication systems wherein optical fibers have an essentially unlimited information capacity which is practically unattainable because of the dispersive effects in optical fibers.

In accordance with the principles of the present invention, fiber chromatic dispersion may be compensated or equalized to substantially remove its effect on propagating lightbeams or lightwave signals. It is contemplated that compensation be performed on the lightwave signal before, after, or even during its exposure to the fiber dispersion in the communication system. Several different embodiments of the invention are described below and shown in the drawing to illustrate various conditions for its use.

Exemplary elements for practicing the present invention are a mode converter and a dispersive waveguide. The mode converter selectively excites a prescribed spatial mode for a lightwave signal so that the spatial mode output by the mode converter is different from the spatial mode input to the mode converter. The dispersive waveguide induces chromatic dispersion in a higher order spatial mode than the fundamental spatial mode wherein the total dispersion is substantially equal in magnitude, and opposite in sign to the desired amount of dispersion to be compensated. Total dispersion (ps/nm) is equal to the chromatic dispersion (ps/nm·km) times the length of the dispersive waveguide (km). By introducing dispersion in the higher order spatial mode of a lightwave signal, it is possible to provide dispersion compensation in a relatively compact device.

Spatial modes of a lightwave signal are mentioned throughout this description. For most lightwave systems which utilize single-mode optical fiber, the usual spatial mode supported by the fiber and waveguides in the system is the fundamental or lowest order spatial mode, $LP_{01}$. Higher order spatial modes such as the $LP_{11}$ spatial mode and others may, in an exemplary embodiment of the invention, be supported in the optical mode converter and dispersive waveguide element.

Guiding properties of all waveguides show an enhanced sensitivity to wavelength of operation when the wavelength of operation is selected to be close to the cut-off wavelength for a given spatial mode. This is typically manifested by a wavelength-dependent change of the propagation constant for the spatial mode near cut-off. For example, in an optical fiber this effect is seen for the $LP_{11}$ spatial mode near its cut-off wavelength and is manifested as an ever-increasing waveguide dispersion as the cut-off wavelength for the spatial mode is approached. It will be understood by those persons skilled in the art that the wavelength of operation ($\lambda_{op}$) generally is selected to be less than the cut-off wavelength ($\lambda_c$) and that the cut-off wavelength is the wavelength above which the particular spatial mode does substantially not propagate in the waveguide.

An understanding of the mechanism for large waveguide dispersion of the exemplary $LP_{11}$ spatial mode can be gained by considering the wavelength dependence of the overlap of mode power with the fiber core. As wavelength is increased toward cut-off of the spatial mode, mode power of the higher order $LP_{11}$ spatial mode extends increasingly into the fiber cladding causing the mode to decrease its overlap of the core. In turn, the group velocity increases because the cladding material has a lower refractive index than the core material. When cut-off is reached, the higher order spatial mode resides substantially totally in the cladding so that the group velocity is determined substantially entirely by the cladding material. As a result, large waveguide dispersion arises from the rapid transition of mode power overlap from the core material to the cladding material.

It is important to note that, while this mechanism causes the group velocity to increase with increasing wavelength, the waveguide dispersion is opposite in sign to the dispersion of conventional single mode fiber supporting lightwave signals at a conventional transmission wavelength such as $\lambda_{op}$ equal to 1.55 $\mu$m. Moreover, because the rate of change of the spatial mode power overlap with the core increases as the cut-off wavelength is approached, the higher order dispersion, that is, the derivative of the dispersion with respect to wavelength, is also opposite in sign to the higher order dispersion in conventional single mode fiber. This is a significant aspect of the instant invention and will be discussed below.

Since this desirable dispersion affects the higher order spatial mode, it is necessary to insure that, in the exemplary embodiment, the light entering the dispersive waveguide element is in the proper spatial mode. It is generally necessary to effect a mode conversion on the light since it usually is in the $LP_{01}$ spatial mode such as when it emerges from a single mode optical fiber or dielectric waveguide or laser. Mode conversion is performed by a low loss, spatial mode converter such as element 11 in FIG. 1 positioned at the input to the dispersive waveguide element. The optical mode converter causes the spatial mode of the signal light to be changed from the $LP_{01}$ spatial mode to the $LP_{11}$ spatial mode, the latter higher order mode being supported by the dispersive waveguide element. Of course, output mode conversion from the dispersive waveguide element to a waveguide or other device is performed by optical mode converters 13 and 22 which cause the reciprocal change in spatial modes back to the fundamental or lower order $LP_{01}$ spatial mode.

The arrangement and number of the elements in the exemplary combination, namely, the mode converter and the dispersive waveguide, depend on the system application. As mentioned above, dispersion compensation may be performed prior to launching the lightwave signal on the transmission medium, after receiving the lightwave signal from the transmission medium, and at one or more locations along the transmission medium between the transmitter and receiver.

An exemplary embodiment for use in a compensation application at the receiver in a lightwave communication system is shown in FIG. 1. Lightwave signals 14 are coupled from the transmission fiber into mode converter 11 for conversion into a higher order spatial mode compatible with dispersive waveguide element 12. From mode converter 11, higher order spatial mode lightwave signal 15 is coupled into dispersive waveguide element 12 where a compensating amount of dispersion is added to the lightwave signal. Output lightwave signal 16 from dispersive waveguide element 12 is suitable for direct application to a photodetection element or photoreceiver (neither shown in the drawing) to recover information from the lightwave signals.

Also shown in FIG. 1 is an optional embodiment in which optical mode converter 13 is connected to the output of dispersive waveguide element 12. Mode converter 13 (shown in dashed box to indicate that it is an optional element) is utilized to convert the high order spatial mode of lightwave signal 16 into a lower or fundamental spatial mode for lightwave signal 17 compatible with a utilization means such as a transmission fiber or waveguide device. As configured in FIG. 1, these elements are well suited for use along a transmission system to compensate all or a portion of the dispersion from the transmission medium of the system. It is also contemplated that the optional configuration of FIG. 1 is applicable at the transmitting or receiving sites where a light source such as a laser generates light or where a photoreceiver accepts light, respectively, in the lower or fundamental spatial mode.

Figure 2:
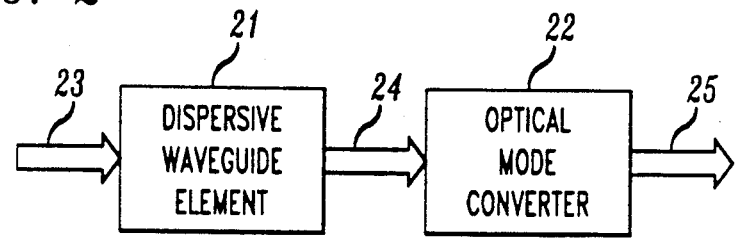

When the lightwave signal is already available in the higher order spatial mode, it is possible to utilize the configuration of elements shown in FIG. 2. This occurs, for example, in a transmitting laser where the output light is available in the higher order spatial mode and it is desired to predistort or precompensate the lightwave signal. As shown in FIG. 2, dispersive waveguide element 21 receives lightwave signal 23 for dispersion compensation. The lightwave signal is in the higher order spatial mode supported by dispersive waveguide element 21. In order to obtain a lightwave signal which is compatible with the transmission medium, output lightwave signal 24 is coupled into optical mode converter 22 for conversion into a lower order spatial mode compatible with the system transmission fiber.

As stated above, dispersion for the higher order modes is controlled as a function of wavelength. That is, the closer the operating wavelength is to the cutoff wavelength, the larger the amount of dispersion available for providing compensation in the dispersive waveguide element. Alternatively, as the operating and cutoff wavelengths tend further apart, there is less dispersion available for compensation. In order to quantify the extent to which the operating and cutoff wavelengths can differ and still allow effective compensation, it has been found that the operating wavelength and the cutoff wavelength desirably differ by no more than about ten percent.

Chromatic dispersion in an optical fiber is often represented as the sum of two components, namely, waveguide dispersion and material dispersion. Waveguide dispersion relates to the contribution from the waveguide geometry whereas material dispersion relates to the refractive index variation of glassy materials as a function of wavelength. For step-index silica-based optical fibers using the LP-mode approximation, waveguide dispersion is a function of the normalized refractive index difference between the core and cladding layers of the fiber, the core radius, the speed of light, and a dimensionless function $\Psi(V)$ dependent only on the normalized frequency V. This relationship is well known to persons skilled in the art and is described in more detail in *Applied Optics*, Vol. 10, pp. 2252 et seq. (1971). I should be noted that V, also called the V-number, is a dimensionless parameter which determines how many modes an optical fiber can support. For example, in step index fibers, the number of guided modes is given approximately by the formula $N=V^2/2$ to include modes of both possible polarizations with both choices of sine and cosine functions.

Figure 3:
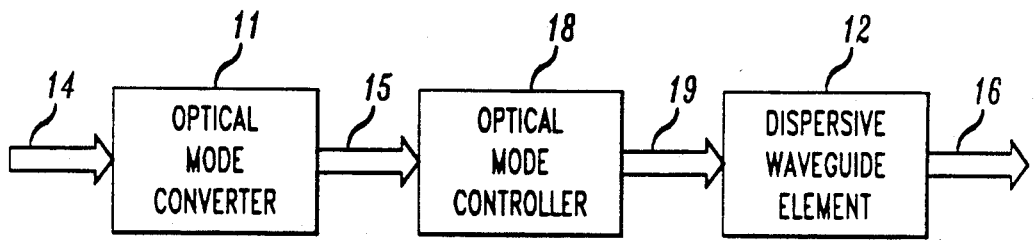

In an example from experimental practice, the dispersive waveguide element in FIGS. 1-3 was fabricated as a step index silica fiber having a high index and a cutoff wavelength for the $LP_{11}$ spatial mode at 1.637 umm. To achieve a large index step in the core of the fiber, a high Ge concentration was required in the core region. A core diameter of 4 $\mu$m was employed in the step-index fiber. The relative effective index difference between the core and cladding layers was determined to be $\Delta=0.02$. This fiber supported propagation of two spatial modes over the wavelength interval 1.050 $\mu$m to 1.637 $\mu$m. This fiber and its core Ge concentration were realized through standard fabrication and doping techniques known to those persons skilled in the optical fiber art. For the exemplary fiber supporting the $LP_{11}$ spatial mode at a wavelength of 1.55 $\mu$m and using a V-number of 2.45, corresponding to $\Psi(V)=20$, it is possible to compute a theoretical dispersion of $-509$ ps/nm·km. Actual measurements for this exemplary fiber indicate that this dispersive waveguide element exhibits a maximum dispersion of $-228$ ps/nm·km for the $LP_{11}$ spatial mode at a wavelength of 1.56 $\mu$m. Such disparity between the predicted theoretical dispersion and the actual observed dispersion is possible from non-ideal shaping for the core index profile of the fiber and the like.

The spatial mode converter is also realizable in an optical fiber embodiment. By combining this embodiment with the fiber-based dispersive waveguide element, it is possible to provide dispersion compensation in an all-fiber arrangement. One recently developed fiber-based mode converter has been described in U.S. Pat. No. 4,974,931 being commonly assigned herewith and whose description is expressly incorporated herein by reference. This exemplary mode converter employed a two-mode fiber (that is, one supporting propagation of both the $LP_{01}$ spatial mode and the $LP_{11}$ spatial mode over a particular wavelength interval) and a length of metallic wire such as gold wire. The length of wire was wrapped around an uncoated section of the two-mode fiber to create a predetermined number of turns under a particular tension. Brass chucks were used to anchor the ends of the wire as solder points to maintain the proper tension while the wrapped section of fiber was potted in epoxy. Spiral wrapping of the fiber causes circularly symmetric microbending of the fiber with a period which affects the wavelength interval over which spatial mode conversion is accomplished.

In the exemplary embodiment, the spatial mode converter was realized by a step index optical fiber different from the fiber for the dispersive waveguide element and having a V-number of 3 at 1.55 $\mu$m to achieve a broadband response characteristic. It has been shown in *J. Lightwave Technology*, Vol. 9, pp. 598–604 (1991) that the bandwidth for resonant coupling between spatial modes at this larger V-number becomes large as a result of the group velocities between the $LP_{01}$ and $LP_{11}$ spatial modes being substantially equal. Wrapping the uncoated section of the fiber 81 with twenty turns of 243 $\mu$m gold wire 82 as shown in FIG. 8 under 30 g tension completed device fabrication. The resulting exemplary mode converter exhibited a full bandwidth at 90% conversion of 95 nm with a peak conversion to the $LP_{11}$ spatial mode of 96% at a wavelength of 1.55 $\mu$m and a device insertion loss of 0.36 dB.

Operation of the dispersion compensation apparatus was verified using nominally 7 ps optical pulses from a modelocked external cavity laser. The pulses were coupled into a single mode fiber having length 5.07 km. Chromatic dispersion in the single mode fiber caused broadening, of the optical pulses by approximately an order of magnitude. After traversing the single mode fiber, the dispersed optical pulse is coupled into the dispersion compensation arrangement. First, the spatial mode was converted from $LP_{01}$ to $LP_{11}$. Next, the higher order spatial mode of the dispersed optical pulse was input to the dispersive waveguide element, namely, the two-mode step-index fiber, having sufficient length and dispersion to effectively restore the original optical pulse shape. In an effort to ensure excitation of the proper higher order spatial mode in the dispersive waveguide element, an optical mode controller (element 18 in FIG. 3) was inserted between the mode converter and the dispersive waveguide element. In one embodiment, the spatial mode controller comprised two loops (4 cm diameter) of optical fiber similar to the fiber in the dispersive waveguide element which was separately rotatable with respect to the mode converter. Rotation of the mode controller permits adjustment of the spatial mode excited in the dispersive waveguide element. Loss in this arrangement approached 5 dB with approximately 2 dB attributable to fiber loss and the remaining loss arising from fusion splices between dissimilar fibers and insertion loss of the mode converter.

Figure 4:
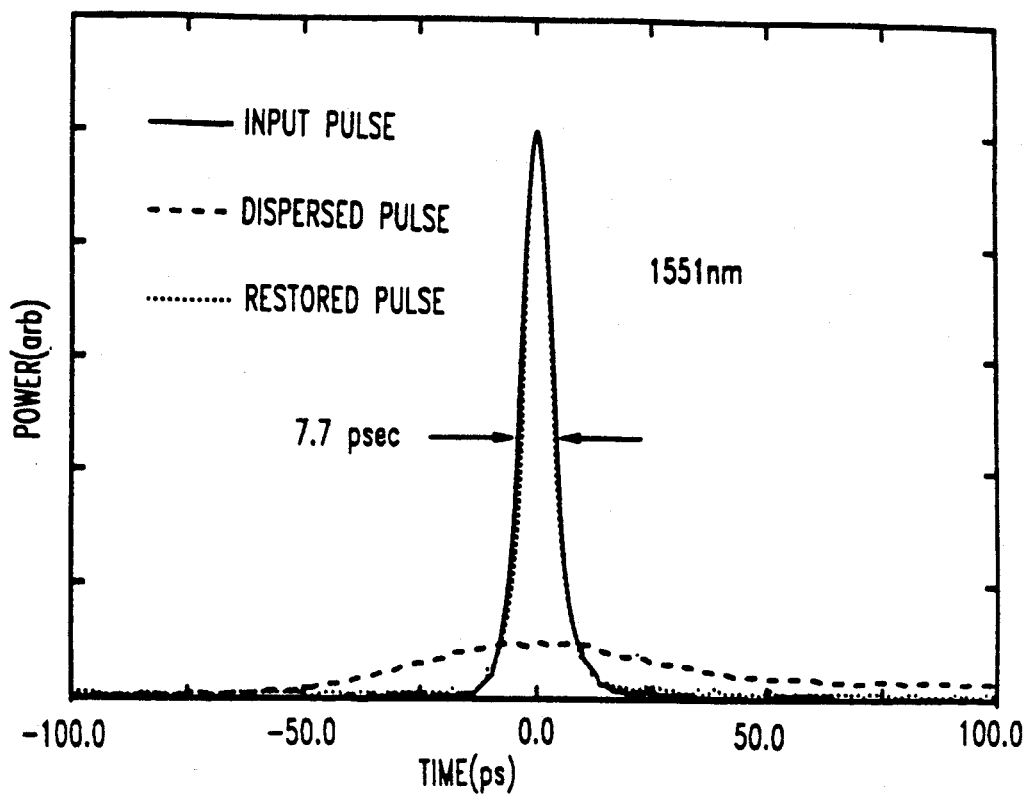
FIGS. 4-5 show graphs of optical pulse power versus time for mode-locked pulses at different wavelengths and at different locations within the dispersion compensation apparatus.
Figure 5:
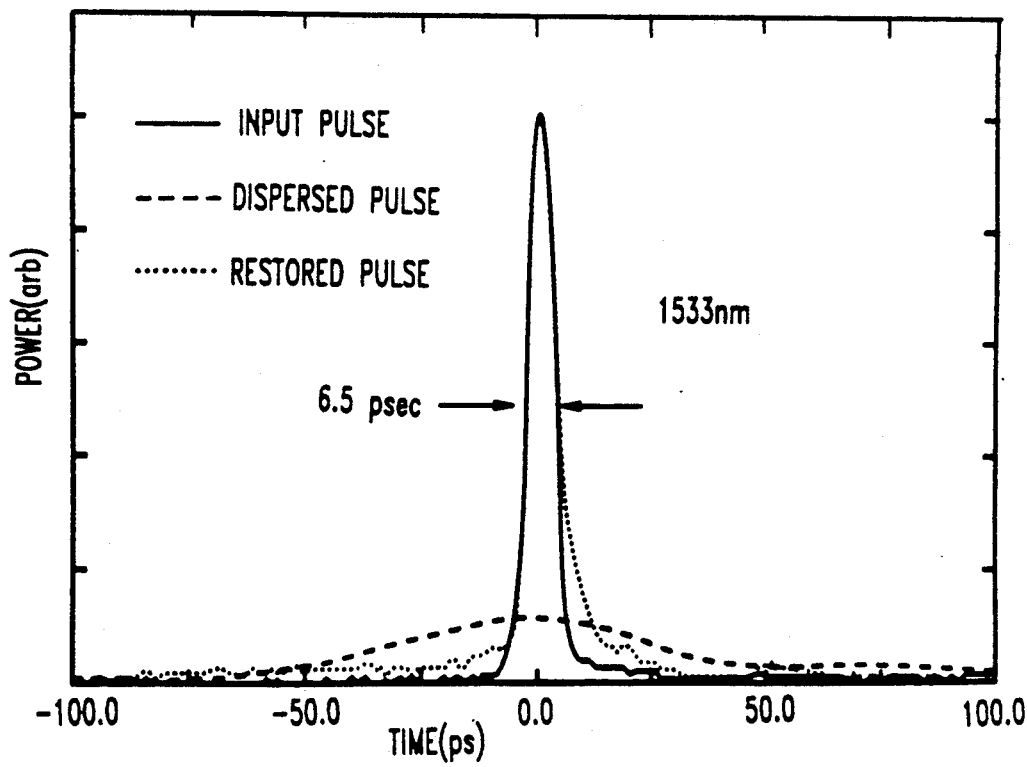

Results from the verification tests on the short optical pulses are shown in FIGS. 4 and 5. In each FIG., arbitrary power units for the input optical pulse (solid line curve), the dispersed optical pulse (dashed line curve), and the restored or compensated optical pulse (dotted line curve) are plotted versus time units. For an operating wavelength of 1.551 μm, complete restoration of the pulse shape was achieved as shown in FIG. 4. In fact, some slight compression of the restored pulse indicates an over-compensation of the dispersion. For a shorter operating wavelength of 1.533 μm, the compensated pulse remained slightly degraded from the input pulse indicative of under-compensation of the dispersion. From these results, it is clear that the dispersion compensation arrangement substantially completely restores the pulse shape of dispersed optical pulses over a broad wavelength range.

To understand the importance of this arrangement, it is worthwhile to consider a long haul transmission system such as a long distance terrestrial (transcontinental) or transoceanic lightwave transmission system. Using standard non-dispersion shifted, single mode fiber for the long haul of approximately 10,000 km, it is possible to equalize the dispersion with an approximate length of 550 km of two-mode fiber as the higher order dispersive waveguide element for the dispersion compensation arrangement described above. That is, by compensating dispersion in the higher order spatial mode, it is possible to use a waveguide element which is 1/20 the length of the overall lightwave transmission system.

While examples of elements for use in the dispersion compensation arrangement have been described above, it is understood by persons skilled in the optical device art that other embodiments of the elements are equally contemplated. For example, geometric and/or stress anisotropy can be introduced into an optical fiber to produce bimodal or two-mode operation. In one example, highly elliptical core fibers have been demonstrated to support propagation of the fundamental spatial mode and a higher order mode. See Kim et al., *Opt. Lett.*, Vol. 12, No. 9, pp.729-731 (1987). Such fibers are useful in the realization of spatial mode converters and dispersive waveguide elements as described above.

Figure 6:
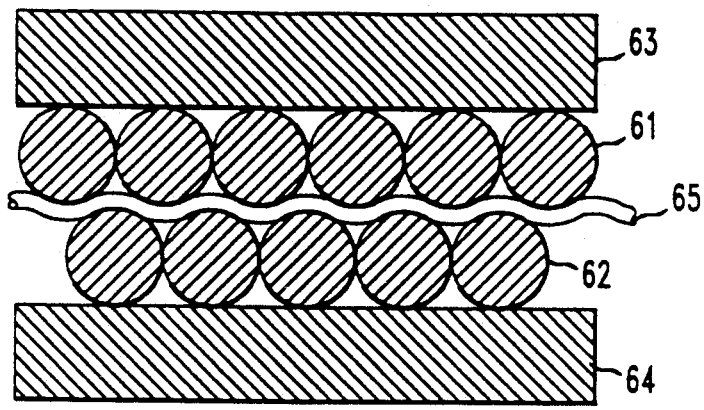

There are many alternative embodiments for spatial mode converters, such as those capable of converting optical signals from the $LP_{01}$ spatial mode to the $LP_{11}$ spatial mode. Taylor in *J. Lightwave Technology*, Vol. LT-2, No. 5, pp. 617-628 describes the use of spatially periodic microbending of anoptical fiber along the fiber axis to permit spatial mode conversion. Realization of such mode converters using spatially periodic microbending has been described by Blake et al., *Opt. Lett.*, Vol. 11, No. 3, pp. 177-9 (1986) and Youngquist et al., *Opt. Lett.*, Vol. 9, No. 5, pp 177-9 (1984). Blake et al. wrap copper wires 61 and 62 (0.025 cm which is approximately the length of fiber, i.e., modal beat length, $L_B$, over which the relative phase delay between the $LP_{01}$ and $LP_{11}$ spatial modes is $2\pi$ for the particular fiber used) around two cylinders 63 and 64, respectively, and bending the fiber 65 between the two rigid structures as shown in FIG. 6. Microbend spacing is shown to be controlled by angling the fiber by a small amount relative to the wires. Youngquist et al. deform the fiber by mechanical stress applied from a rigid crenelated plate structure where the period (combined ridge and gap length) substantially matches the modal beat length. The fiber is placed between a rigid polished plate and the crenelated plate while pressure is applied by clamping or screwing the plates together.

Figure 7:
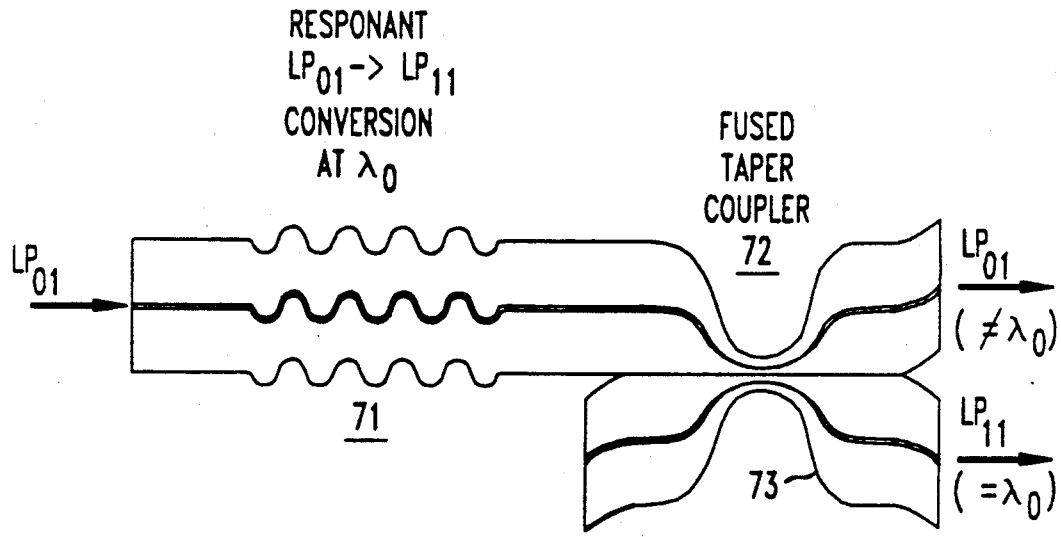

Wavelength selective mode conversion is also contemplated using an inline bimodal fiber tap as described by Hill et al., *IEEE Photonics Technology Lett.*, Vol. 2, No. 7, pp. 484-6 (1990). This device as depicted in FIG. 7 employs a section of bimodal fiber 71 having a periodic perturbation (stress induced holographically written or the like) for performing resonant mode conversion from $LP_{01}$ to $LP_{11}$ at a particular wavelength followed by a fused directional coupler 72 for separating the fundamental mode (at other than the particular wavelength) from the higher order mode at the particular wavelength. Only the higher order mode is coupled into the secondary fiber 73 of the fused directional coupler 72.

Additional mode converters are realized by using a photoinduced grating or holographically written grating on a two-mode optical fiber as described by Park et al., *Elect. Lett.*, Vol. 25, No. 12, pp. 797-9 (1989). The grating period is substantially equal to the modal beat length $L_B$. By virtue of the grating, the refractive index of the fiber core undergoes a permanent change to permit spatial mode conversion. In a further embodiment, phase-matched evanescent modal coupling is achieved in a device having a single mode fiber contacting a bimodal fiber wherein the fibers are ground and polished to achieve the desired transfer coupling. See Sorin et al., *Opt. Lett.*, Vol. 11, No. 9, pp. 581-3 (1986).

While the use of multimode fibers in place of the bimodal fibers is contemplated, such substitution can degrade performance of the dispersion compensation arrangement because of modal dispersion. Modal dispersion occurs when light is accidentally transferred from the desired $LP_{11}$ spatial mode to another spatial mode such as the fundamental $LP_{01}$ spatial mode as the lightwave signal propagates along the fiber. Such coupling can occur as a result of imperfect splices between fiber sections or through mechanical stresses put on the fiber in spooling and/or cabling. Since different spatial modes have different velocities, light that is coupled over to other than the desired spatial mode arrives at the fiber output at a different time from the light in the desired mode thereby causing pulse broadening. This problem is solved in a bimodal step-index fiber that propagates both the $LP_{11}$ and $LP_{01}$ modes by adding an absorbing dopant to a small central region of the fiber core substantially along the longitudinal axis of doped fiber. Unpumped rare earth ions such as $Er^{3+}$ are an exemplary absorbing dopant for such an application in the wavelength region around 1.55 μm. Doped core region 93 is expected to be smaller than the core cross-section 92. With the absorbing region substantially at the center of the fiber core, the fiber suppresses the fundamental $LP_{01}$ spatial mode much more strongly than the $LP_{11}$ mode since the fundamental mode has its intensity peak substantially centralized in the core region whereas the $LP_{11}$ spatial mode has an intensity null at the center of the core. Light which is inadvertently coupled over to the unwanted fundamental mode from the higher order mode is substantially completely absorbed and therefore contributes only negligibly to optical pulse broadening. The criterion for effectively eliminating modal dispersion is that the absorption length $1\alpha$, where $\alpha$ is the absorption coefficient, be much smaller than the coupling length for the modes which is the characteristic length over which power is transfer-red from one mode to another.

Another modification contemplated for use in the dispersion compensation arrangement includes the provision of arbitrary optical gain by the addition of rare earth dopant material such as Erbium to the fiber core. Since the $Er^{3+}$ can be made to have a relatively small effect on the dispersive characteristics of the fiber, its distribution can be optimized separately from dispersion considerations to provide the desired amount of gain when pumped by an appropriate laser source. An exemplary embodiment of this alternative in a step index fiber to provide gain and to alleviate concomitantly the aforementioned modal-dispersion is realizable by doping a small annular region 94 of the fiber core 92 to match the high intensity pattern for the higher order spatial mode along the longitudinal axis of the optical fiber. The annular distribution of dopant material provides preferential gain for the higher order spatial mode over the fundamental spatial mode. This occurs because the latter has most of its intensity located at the center of the fiber core whereas the former has its intensity distributed in an annular region 94 outside the core center. Because of the greatly reduced gain for the fundamental mode, light which is accidentally coupled over to the fundamental mode exhibits a far lower power at the fiber output relative to higher order spatial mode light. In this way, the effects of modal dispersion are again overcome.

An advantage of the latter embodiment is that, where the pump laser light wavelength is close enough to the signal light wavelength and where the mode converter has a broadband response, the pump light can also be coupled into the doped fiber in the higher order spatial mode along with the signal light to provide optimum spatial overlap with the annular $Er^{3+}$ doped core region for efficient pumping. Close wavelength spacing is observed for 1.480 μm pump light for Er-doped fiber amplifiers and 1.550 μm signal light.

As disclosed above, dispersion compensating (DC) fiber can be designed such that " . . . the higher order dispersion, that is, the derivative of the dispersion with respect to the wavelength, is also opposite in sign to the higher order dispersion in conventional single mode fiber." This offers the possibility of further improvement in system operating characteristics, namely, the possibility of relatively low chromatic dispersion over a relatively wide wavelength range, such that signals can be transmittal at high rate over a multiplicity of WDM channels.

More specifically, the invention is embodied in an optical fiber communication system that comprises, in addition to a length L (not necessarily a continuous length) of conventional single mode (SM) fiber, a length $L_{DC}$ (also not necessarily a continuous length) of DC fiber. Those skilled in the art will appreciate that L could be the length of conventional fiber between transmitter and receiver, or that it could be the length of conventional fiber in any appropriate portion of the transmission path, e.g., the length of a span from regenerator (or optical amplifier) to regenerator (or amplifier).

Typically L is much larger than $L_{DC}$, desirably $L \geq 5L_{DC}$ or even $10L_{DC}$. The DC fiber not only has chromatic dispersion at a predetermined wavelength $\lambda_{op}$ (typically about 1.5 μm) of the opposite sign as the chromatic dispersion of the SM fiber at $\lambda_{op}$ but also has a derivative with respect to wavelength of the chromatic dispersion that has the opposite sign as the derivative of the chromatic dispersion of the SM fiber over a range of wavelengths that typically includes $\lambda_{op}$. Chromatic dispersion of the conventional SM and the DC fiber will be designated D and $D_{DC}$, respectively, and the derivative of the chromatic dispersion with respect to $\lambda$ will be designated D' and $D'_{DC}$, respectively. Typically D and D' are positive at about 1.5 μm.

The DC fiber is designed, and $L_{DC}$ is selected such that, typically, $LD + L_{DC} \cdot D_{DC} \sim 0$ at $\lambda_{op}$, and such that, typically, the absolute value of $(LD + L_{DC} \cdot D_{DC})/(L + L_{DC})$ is less than a predetermined value (e.g. less than 1.5 ps/nm·km) for all wavelengths in a wavelength range (exemplarily at least about 50 nm) that includes $\lambda_{op}$. The latter condition can be met if $-D'_{DC} \sim (L/L_{DC}) \cdot D'$ at $\lambda_{op}$. For instance, a step index DC fiber (core diameter 4 μm, effective index difference between core and cladding 2%, cut off wavelength of $LP_{11}$ 1.640 μm) had about −228 ps/nm·km chromatic dispersion at 1.56 μm. Joining a length $L_{DC}$ of the DC fiber to a length L ($L_{DC} = L/13.2$) of conventional single mode fiber (AT&T's 5D SM fiber) resulted in a combination that had dispersion of absolute value less than 0.4 ps/nm·km over the wavelength interval from 1.53–1.56 μm, and substantially less than 1.5 ps/nm·km over a 50 nm wavelength region that includes 1.56 μm. See also C. D. Poole, et al., post deadline paper digest, Optical Fiber Conference, San Jose, Calif., Feb. 6, 1992, and C. D. Poole et al., *Optics Lett.*, Vol. 17 (14), p. 985, Jul. 5, 1992, and Poole et al., *Proceedings for European Conf. on Optical Communication ECOC'92*, Berlin, Germany, Volume 3, paper PDI.4, "Elliptical-Core Dual-Mode Fiber Dispersion Compensator," all incorporated herein by reference.

Those skilled in the art will also appreciate that practice of the instant invention does not require use of the above disclosed DC fiber and mode conversion. Indeed, any DC fiber that yields the required $D'_{DC}$ of appropriate sign is contemplated for use according to the invention. Exemplarily, such a fiber is disclosed in co-assigned U.S. patent application Ser. No. 978,002, filed Nov. 18, 1992 for A. M. Vengsarkar, et al., entitled "Article Comprising a Dispersion-Compensating Optical Waveguide", incorporated herein by reference.

FIG. 11 schematically depicts an exemplary optical fiber communication system according to the invention wherein numeral 120 refers to signal radiation emitted by transmitter 110 which is guided in transmission fiber 130 to optical amplifier/dispersion compensator 140, is then typically guided through further lengths of transmission fiber and further amplifiers/compensators (not shown) to receiver 160. Exemplarily the amplifier/compensator comprises a length of DC fiber 170 and EDFA 180. Pump radiation 190 is provided to combination 140 to be coupled into the EDFA. It will be appreciated that the functions of compensation and amplification could be performed by rare earth-doped DC fiber.

I claim:

1. An article comprising a length $L_{DC}$ of optical fiber (said fiber to be designated "DC" fiber) that supports propagation of radiation of wavelength $\lambda_{op}$, where $\lambda_{op} \sim 1.5$ μm, and further comprising a length $L$ of optical fiber that is single mode fiber for radiation of wavelength $\lambda_{op}$, that has chromatic dispersion $D(\lambda)$ at wavelength $\lambda$ and that furthermore has a derivative with respect to wavelength $D(\lambda)'$ of the chromatic dispersion at wavelength $\lambda$;

CHARACTERIZED IN THAT the DC fiber has chromatic dispersion $D_{DC}(\lambda)$ at wavelength and furthermore has a derivative with respect to wavelength $D'_{DC}(\lambda)$ of the chromatic dispersion at wavelength $\lambda$, with $D_{DC}(\lambda)$ and $D'_{DC}(\lambda)$ being of the opposite sign as $D(\lambda)$ and $D'(\lambda)$, respectively, at $\lambda = \lambda_{op}$.

2. The article of claim 1, wherein the DC fiber is selected such that $L_{DC} \cdot D_{DC}(\lambda) + L \cdot D(\lambda)$ is approximately equal to zero at $\lambda_{op}$, and where in $L$ is much greater than $L_{DC}$.

3. The article of claim 2, wherein the DC fiber is further-more selected such that the absolute value of $[L_{DC} \cdot D_{DC}(\lambda) + L \cdot D(\lambda)]/(L_{DC} + L)$ is less than 1.5 ps/nm·km for all wavelengths in a wavelength range that is at least 50 nm and includes $\lambda_{op}$.

4. The article of claim 1, wherein the DC fiber is selected such that $D'_{DC}(\lambda)$ is essentially equal to $-(L/L_{DC})D'(\lambda)$ at $\lambda = \lambda_{op}$.

5. The article of claim 1, wherein the article is an optical fiber communication system that comprises a transmitter, a receiver, and an optical fiber transmission path signal-transmissively connecting the transmitter and the receiver, the transmission path comprising said lengths of fiber $L_{DC}$ and $L$, and wherein $L > 5L_{DC}$.

6. The article of claim 5, wherein $L_{DC} + L$ is substantially the total length of the transmission path.

7. The article of claim 5, wherein the optical fiber communication system further compromises an optical amplifier intermediate the transmitter and the receiver.

8. The article of claim 7, comprising a plurality of optical amplifiers intermediate the transmitter and the receiver, wherein $L_{DC} + L$ is substantially the total length of the transmission path between a given optical amplifier and an optical amplifier adjacent to the given one.

9. The article of claim 1, compromising first means for converting a lightwave signal of wavelength $\lambda_{op}$ from a first spatial mode to a second spatial mode, the second spatial mode being a higher order spatial mode than the first spatial mode; wherein the DC fiber supports propagation of the lightwave signal substantially in the second spatial mode and is connected to an output of the first converting means.

10. The article of claim 1, wherein said optical fiber that is single mode fiber for radiation of wavelength $\lambda_{op}$ has zero chromatic dispersion at a wavelength less that $\lambda_{op}$.

11. The article of claim 10, wherein the article is an optical fiber communication system, and wherein said wavelength less than $\lambda_{op}$ is about 1.3 μm.

* * * * *

UNITED STATES PATENT AND TRADEMARK OFFICE
CERTIFICATE OF CORRECTION

PATENT NO. : 5,261,016
DATED : November 9, 1993
INVENTOR(S) : Craig D. Poole

It is certified that error appears in the above-indentified patent and that said Letters Patent is hereby corrected as shown below:

Column 11, line 23, "wavelength" should read --wavelength $\lambda$,--.

Signed and Sealed this

Twenty-fourth Day of May, 1994

*Attest:*

BRUCE LEHMAN

*Attesting Officer*     *Commissioner of Patents and Trademarks*